US006967563B2

(12) United States Patent
Bormaster (10) Patent No.: US 6,967,563 B2
(45) Date of Patent: Nov. 22, 2005

(54) INVENTORY CONTROL SYSTEM (76) Inventor: Ronald Bormaster, P.O. Box 710470, Houston, TX (US) 77271-0470

( * ) Notice: Subject to any disclaimer, the term of this patent is extended or adjusted under 35 U.S.C. 154(b) by 0 days.

(21) Appl. No.: 10/118,524

(22) Filed: Apr. 8, 2002

(65) Prior Publication Data
US 2002/0158751 A1 Oct. 31, 2002

Related U.S. Application Data (63) Continuation of application No. 09/329,860, filed on Jun. 11, 1999, now abandoned.

(51) Int. Cl.[7] .............................................. H04Q 5/22
(52) U.S. Cl. ................................. 340/10.31; 340/10.2
(58) Field of Search ............................ 340/10.2, 10.1, 340/10.31, 10.32, 10.33, 10.5, 5.92, 825.49; 235/383, 385; 370/445; 342/457

(56) References Cited

U.S. PATENT DOCUMENTS

| 4,042,918 | A | | 8/1977 | Klitzman ..................... 340/280 |
| 4,489,314 | A | * | 12/1984 | Miller ......................... 340/568 |
| 4,535,322 | A | | 8/1985 | Yeski .......................... 340/571 |
| 4,862,160 | A | | 8/1989 | Ekchian et al. ........ 340/825.54 |
| 4,899,135 | A | | 2/1990 | Ghahariiran ................ 340/573 |
| 4,922,229 | A | | 5/1990 | Guenst ........................ 340/572 |
| 4,973,944 | A | | 11/1990 | Maletta ....................... 340/568 |
| 5,001,461 | A | | 3/1991 | Vroom et al. ................ 340/572 |
| 5,028,909 | A | | 7/1991 | Miller ......................... 340/568 |
| 5,182,543 | A | | 1/1993 | Siegel et al. ................. 340/351 |
| 5,289,163 | A | | 2/1994 | Perez et al. .................. 340/539 |
| 5,493,274 | A | | 2/1996 | Long ........................... 340/568 |
| 5,525,967 | A | | 6/1996 | Azizi et al. .................. 340/573 |
| 5,530,702 | A | * | 6/1996 | Palmer et al. ............... 370/445 |
| 5,539,394 | A | * | 7/1996 | Cato et al. ................ 340/10.32 |
| 5,557,259 | A | | 9/1996 | Musa .......................... 340/573 |
| 5,565,845 | A | | 10/1996 | Hara .......................... 340/568 |
| 5,646,593 | A | | 7/1997 | Hughes et al. .............. 340/573 |
| 5,661,460 | A | | 8/1997 | Sallen et al. ................. 340/573 |
| 5,686,902 | A | * | 11/1997 | Reis et al. .................. 340/10.2 |
| 5,689,240 | A | | 11/1997 | Traxler ....................... 340/573 |
| 5,757,271 | A | | 5/1998 | Andrews ..................... 340/568 |
| 5,841,352 | A | | 11/1998 | Prakash ...................... 340/573 |
| 5,844,483 | A | | 12/1998 | Boley ......................... 340/568 |
| 5,870,023 | A | | 2/1999 | Jackson ...................... 340/568 |

FOREIGN PATENT DOCUMENTS

| US | 0 568 180 A2 | 11/1993 | ........... G06F 15/24 |
| US | EP 0 702 324 A2 | 3/1996 | ........... G06K 17/00 |

OTHER PUBLICATIONS

"MCRF335/360: 13.56 MHz Passsive RFID Device with Anticollision", 1999 Microchip Technology, Inc., Apr. 1999.
PCT International Preliminary Examination Report. Aug. 1, 2002.

* cited by examiner

Primary Examiner—Michael Horabik
Assistant Examiner—William Bangachon
(74) Attorney, Agent, or Firm—Robert W. Strozier (57) ABSTRACT

An inventory control system is described which includes anti-collision, radio frequency identification apparatus or tags affixed to each item of an inventory and including a unique code, an interrogator/reader that generates a field of sufficient range to activate each tag associated with each item of the inventory in communication with a computer. The computer includes a list comprising an identifier for each item in the inventory, the code for the tag associated with each item in the inventory and an item status where the status indicates whether the item is present or absent.

23 Claims, 5 Drawing Sheets

INVENTORY CONTROL SYSTEM

RELATING APPLICATIONS

This application is a continuation of U.S. Patent application Ser. No. 09/329,860 filed 11 Jun. 1999, now abandoned.

BACKGROUND OF THE INVENTION

1. Field of the Invention

The present invention relates to an inventory control system where each item of the inventory is tagged with an anti-collision, radio frequency identification apparatus, and the tags are interrogated and read by an interrogator/reader.

More particularly, the present invention relates to an inventory control system where an interrogator/reader supplies energy to an anti-collision, radio frequency identification apparatus or tag affixed to each item of the inventory and having a unique programmable identifier and a digital processing unit which stores data sufficient to associate a given tag identifier with a particular item of inventory and is capable of identifying inventory items outside of the range of the field generated by the interrogator/reader.

2. Description of the Related Art

Various inventory control systems have been described and implemented in the market place such as systems for keeping track of items used in games or sports such as golf, skiing or the like or for keeping track of children or any other item or animal in a given situation. Such systems are described in various U.S. Pat. Nos.: 5,870,023; 5,844,483; 5,841;352; 5,757,271; 5,689,240; 5,661,460; 5,646,593; 5,565,845; 5,557,259; 5,525,967; 5,493,274; 5,289,163; 5,028,909; 5,001,461; 4,973,944; 4,922,229; 4,899,135; 4,489,314; 4,535,322; and 4,042,918, incorporated herein by reference.

Although such systems provide some tracking and protection against loss of an item, such systems do not provide efficient multi-item tracking, loss or misplacement protection. Thus, there is a need in the art for a system which can identify and keep track of multiple items and alert a user when items are lost or misplaced.

SUMMARY OF THE INVENTION

The present invention provides an inventory control system for tagging, identifying and tracking items of an inventory so that accurate inventory accounting can be performed, especially after activities involving use of items of the inventory. The system includes a digital processing unit (DPU). The DPU includes at least a processing unit, a memory, an operating system, communication hardware and software, and a peripheral for interaction with a user. The DPU also includes a list or table having an entry for each item in the inventory and comprises at least a unique item identifier (name), a unique item modulation code, and an item status indicator. The system also includes a radio frequency, identification (RFID) apparatus removably or permanently affixed to each item in the inventory and encoded with that item's unique modulation code. The system further includes an interrogator/reader in communication with the DPU that causes any RFID apparatus within a range of the interrogator/reader to transmit a signal modulated by its unique code. The interrogator/reader receives the signal and forwards the code to the DPU which updates the file so that the status indicator, flag or field of the item associated with the transmitting RFID apparatus is set to a "present" condition (i.e., the item is within the range of interrogator/reader); otherwise the status indicator is set to an "absent" condition (i.e., the item is outside of the range of the interrogator/reader). Optionally, the operating system includes a user interface so that the user can interact with the DPU via the peripheral. The user interaction would include at least requesting a current inventory status check or the like.

The present invention also provides a method for tagging, identifying, tracking and notifying a user when an item in an inventory is not returned to its pre-use place or designated location after completion of a given activity involving at least one item in the inventory. The method includes tagging each item of the inventory with a radio frequency, identification (RFID) apparatus encoded with an item specific code and storing the code in an item indexed list in a digital processing unit (DPU) where the list includes a unique item identifier, the item specific code and an item status flag. Once tagged, an interrogator/reader causes each item RFID to emit a periodic signal whenever the RFID is within a range of a radio frequency (RF) field generated by the interrogator/reader. A received signal causes the interrogator/reader to send the code embedded in the signal to the DPU which sets the item status indicator flag to a condition indicating the item is within the field, e.g., to a present condition. When an item is positioned outside of the range of the RF field generated by the interrogator/reader, then the RFID stops transmitting its signal, the interrogator/reader stops receiving the signal and stops sending the code to the DPU. The DPU, then, sets the item status indicator flag to a condition indicating that the item is outside the field, e.g., an absent condition. When the item is returned to a position within the range of the interrogator/reader, the RFID is activated and begins emitting its signal again, which is received by the interrogator/reader. The interrogator/reader then sends the code to the DPU which in turn sets the item status indicator flag back to a present condition. Upon completion of the activity or task, the DPU can be polled by a user to determine whether any items are missing and the identity of any missing items. The missing items can then be sought, marked missing or deleted from the list. Alternatively, the DPU can alert the user of a missing item condition by beeping, flashing or some other suitable signal.

DESCRIPTION OF THE DRAWINGS

The invention can be better understood with reference to the following detailed description together with the appended illustrative drawings in which like elements are numbered the same.

DETAILED DESCRIPTION OF THE INVENTION

The inventor has found that an efficient and effective system for keeping track of items in an inventory can be designed by affixing to each item in the inventory an anti-collision, radio frequency, identification (ACRFID) apparatus so that a digital processing unit (DPU) can determine when an item is inside or outside a range of a field generated by an interrogator/reader apparatus. The inventory can comprise a plurality of items such as books, children, livestock, toys, equipment, sports equipment such as golf equipment, soccer equipment, baseball equipment, fishing equipment, etc., parts of an apparatus or an article, medical equipment used in operating rooms, items used to repair an apparatus or an article, files, or any other item in a given locale or location.

Broadly, the system of the present invention includes a plurality of radio frequency identification (RFID) apparatus, and preferably, RFID with anti-collision capabilities removably or permanently affixed to each item or animal of an inventory, where each apparatus is capable of being encoded with a unique identification code. The system also includes an interrogator/reader designed to generate an RF field capable of activating the RFID's. Each RFID within range of the RF field emits a signal modulated by its unique code. The system further includes a DPU in communication with the interrogator/reader. The DPU is designed to receive unique codes and modify an item status field of a list including at least a unique item identifier, its associated unique code of the RFID affixed to the item, and an item status indicator, e.g., a flag or field. When an item of the inventory is within the range of the field generated by the interrogator/reader, then the item's RFID transmits a signal modulated by the code. The interrogator/reader receives the signal, retrieves the code and sends it to the DPU. The DPU then sets the item's status flag to a "present" or "TRUE" condition. If an item is moved of a location outside of the range of the interrogator/reader, then the DPU will set the item's status flag to an "absent" or "FALSE" condition due either to a loss of signal or due to a timeout event.

The method of present invention implemented on a DPU includes affixing to each item or animal of an inventory an RFID encoded with a unique code, storing on the DPU in a list including at least a unique item or animal descriptor or identifier, the unique code associated with its affixed RFID and a status flag indicating whether the item or animal is inside or outside a range of an interrogator/reader associated with the DPU. When an item is moved to a location outside the range of the interrogator/reader, the DPU will change the item's status from a "present" or "TRUE" condition to an "absent" or "FALSE" condition. The DPU can then be polled at any time to determine the status of all tagged items or animals within the inventory or plurality. Alternatively, the DPU can change to an "alert" condition if any item in the inventory is outside the interrogator/reader range and provide a corresponding "alert" indication.

One preferred system of the present invention is a golf equipment tracking system, where a golf bag includes a DPU, an interrogator/reader, and a plurality of golf items such as clubs, gloves, or the like having affixed or attached an ACRFID encoded with a unique code. Thus, when a club is removed from the bag, the club will stop transmitting a signal to the interrogator/reader associated with the DPU. When the signal stops, the DPU will update a status of the club to evidence that the club has been removed. If the club is returned, then the field generated by the interrogator will cause the tag to resume emitting a signal containing its unique code, the interrogator will receive the signal and the DPU will update the status of the club to indicate that the missing club has been return to the bag. At any time, the golfer can request the DPU to identify any golf equipment that does not have its status in a "present" condition, i.e., identify the equipment that has not been returned.

Alternatively, the software implemented in the DPU can indicate an "alert" condition if a club is removed from the bag and is not returned after some specified period of time. Thus, the DPU software can include routines that time/date stamp a field associated with items in the inventory when an item is moved to a location outside of the activating field generated by the interrogator and the item's tag stops transmitting its signal. The routines will then check the time/date stamp for a time off condition evidencing that the item has not been returned within a specified period of time. Alternatively, the software can include timer routines that start a timer when communication with a tag ceases because the item is now located outside of the activating field. The timer will be set to some specified period and a time out will indicate that the item has not been returned. In either event, a time out will cause the software to place the system in an "alert" condition. Once the item is returned and its tag is in communication with the interrogator/reader, then the time keeping routines will discontinue time monitoring or disable the timer, set its status field to a "present" condition and disable the "alert" condition.

Another preferred embodiment of the present invention is a medical equipment tracking system for use in operating rooms. This system includes a DPU, an interrogator/reader in communication with the DPU, and a plurality of medical equipment such as scalpels, other instruments, sponges, or the like, each having affixed or attached an ACRFID tag encoded with a unique code. When the tagged items are within an activation zone generated by the interrogator/reader, the tags will transmit a signal modulated by its unique code and the DPU will set the item's status to a condition evidencing its presence within that zone. When an item such as a sponge is removed from the zone, then the item's tag will stop transmitting its signal causing the DPU to update its status indicating that the items has been moved to a location outside of the zone. If the item is returned to a location within the zone, then the interrogator will cause its tag to resume transmitting its signal containing its unique code and the DPU will update its status indicating that the item is within the zone. At any time, a medical service provider can request the DPU to identify any equipment that does not have its status in a present condition, i.e., identify the items that have not been returned to a location within the zone.

Suitable ACRFID tags include, without limitation, tags manufactured by Microchip Technology Inc. as set forth on its web site microchip.com including MCRF355 tags or the like as well as any other field activated apparatus that will transmit a signal modulated with a unique modulation code. The interrogator and tag can be used to provide inventory control systems within the scope of the present invention that are capable of activating a large number of tags within a given space. The antenna array on the tag and the strength of the field generated by the interrogator can be adjusted by those skilled in the art to increase or decrease a zone within which a "TRUE" or "present" condition will be indicated. For example, a larger antenna size and a stronger field will increase the size of the zone within which the tags will be activated by the field. Correspondingly, a smaller antenna size and weaker field strength will reduce the size of the zone within which the tags will be activated by the field.

By controlling the antenna size associated with the tags and the interrogator field strength, the size of the zone within which the tags will be activated can be controlled to a desired degree of accuracy and precision. The specified tags have an upper limit of several tens of feet. Anti-collision is generally performed by software and hardware of the tag which delays signal transmission whenever the hardware and software of the tag senses transmission by another tag. Thus, the tags preferably send only periodic signals to the interrogator/reader in such a manner that the reader only receives signal transmission during a specified period of time. Thus, these tags generally transmit only a periodic signal. Because these tags generally transmit only periodically, the tracking software will be designed to expect a signal from a tag at some set interval. If a tag fails to transmit a signal within the interval, then the software can immediately set an alert or alarm condition (beep, flash, buzz, hum or the like), can wait a given length of time before going into an alarm condition or simply note the lack to transmission and await user polling. For child care inventory system, immediate alert or alarm setting will be preferred. Immediate alarms will also generally be preferred for store setting or other setting where immediate response to removed items is required.

Tags designed to function in an anti-collision manner have programmable memory on the tag. The programmable memory includes at least an address for a unique code that will be used to modulate the signal transmitted by the tag. The signal is generally in the tens of megahertz range and preferably in the 10 to 15 MHz range and especially in the 12 to 14 MHz range and most preferred between about 13 and about 14 MHz. The size of the address for the code will determine the number of tags that can be polled simultaneously by a single interrogator. The tags from Microchip have a 15 bit code address memory allowing $2^{15}$ (40,728) tags to be simultaneously polled. Generally, the address is at least 7 bits in length, and preferably at least 15 bits in length. Of course, tags with smaller or larger memory addresses will allow smaller and larger inventories to be polled.

Suitable DPUs include, without limitation, a computer containing a processing unit, a memory, at least one communication protocol supported by associated hardware and software, at least one peripheral, an operating system and a filed creation, editing and management system such as a database program, a word processing program, a spreadsheet program or the like.

Figure 1A:
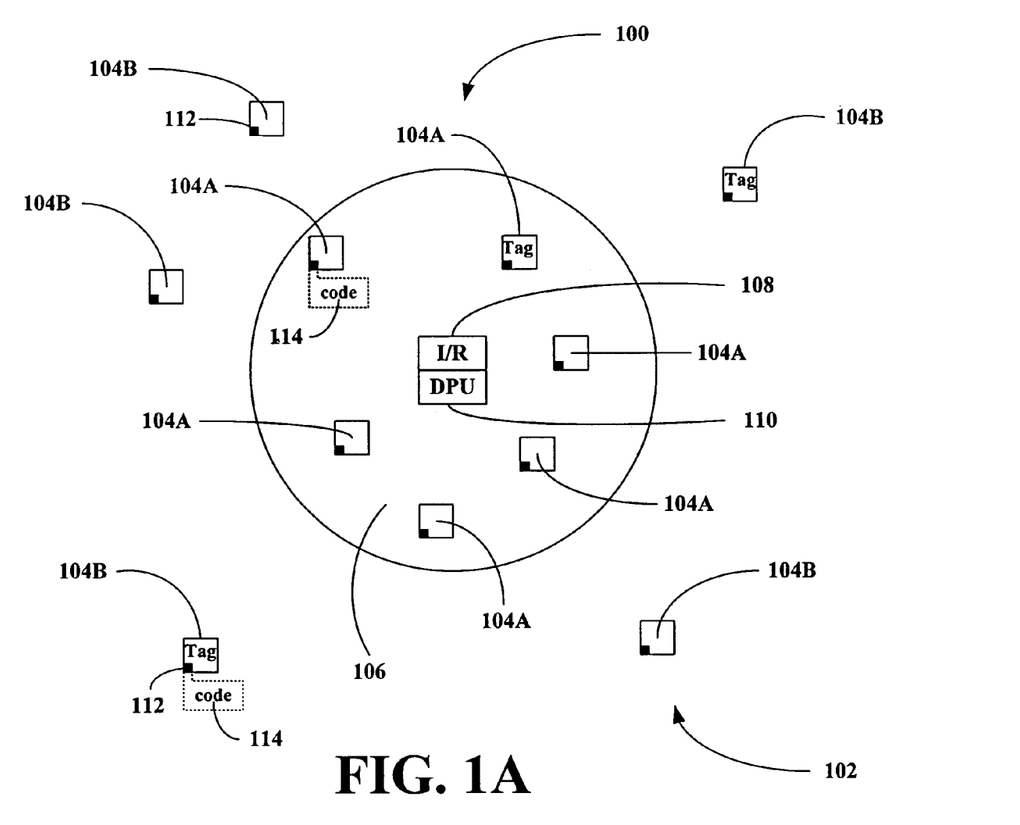
FIG. 1A depicts a preferred embodiment of an inventory control system of the present invention.

Referring now to FIG. 1A, a preferred embodiment of an inventory control system of the present invention 100 generally includes an inventory 102 of items 104A located inside and items 104B located outside of an activation zone or field 106 generated by an interrogator/reader 108 in communication with a DPU 110. Each item 104 is tagged with a field activated tag 112 having a unique modulation code 114.

Figure 1B:
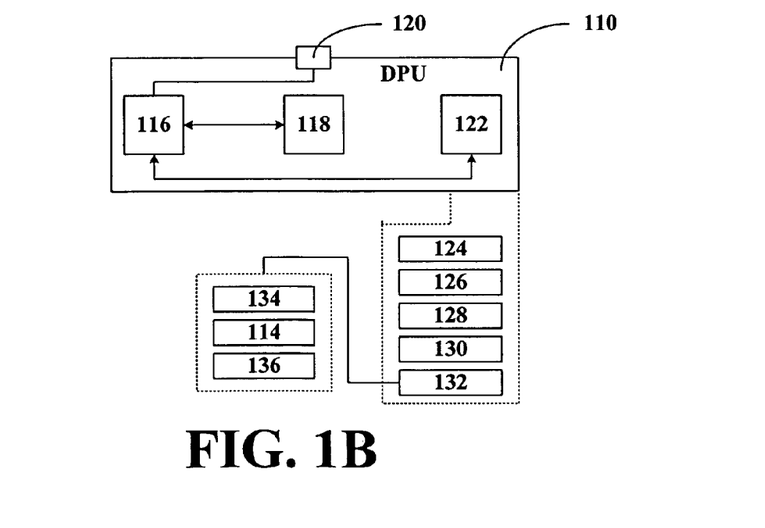
FIG. 1B depicts a preferred configuration of a digital processing unit used in the inventory control systems of the present invention.

A preferred DPU 110 for use in the present invention is depicted generally in FIG. 1B. The DPU 110 includes a processing unit 116, a memory 118, communication hardware 120, and a peripheral 122 for interfacing with a user. The DPU 110 further includes an operating system 124, preferably a windowing operating system, a user interface 126, preferably a graphics user interface (GUI) and communication software 128. The DPU 110 further includes word or list handling software 130 and a list 132 comprising an identifier 134 for each item 104 of the inventory 102, the unique code 114 of its associated tag 112 and a status field 136 which indicates whether a particular inventory item 104 is inside or outside of the field 106 generated by the interrogator/reader 108.

For the items 104A inside the field 106, their status field 134 will indicate that the item is present. If the status field 136 is simply a true/false flag, then a TRUE condition of the status field 136 can indicate inside or outside the field 106, while a FALSE condition can represent the opposite. Thus, the status field 136 associated with each item 104A would be in a TRUE condition, while the status field 136 associated with each item 104B would be in a FALSE condition. At any time, the user can enter a command through the peripheral 122 using the user interface 126 in conjunction with the operating system 124 to determine the status of each item in the inventory.

If all of the items 104 originally start out within the field 106, then their status fields 136 will all be in a TRUE condition. After a given activity involving the items 104, some items 104B may not be returned to a location within the field 106 and the status field 136 for those items would be in a FALSE condition. If the inventory is then polled either by the user or the DPU 110, then the user or the DPU 110 can determine which items have a FALSE condition, and, are, therefore, not within the field 106 generated by the interrogator/reader 108.

Additionally, the DPU 110 can sound an alarm if any item in the inventory is not returned to a location within the field 106 after a given time after its removal or after the commencement of a given task or activity. If the inventory includes items used in a medical procedure, then the DPU 110 can be polled after the completion of surgery or after the estimated time the surgery should take, and missing items of inventory can be located and returned to their appropriate place.

Moreover, the DPU 110 can include additional hardware and software to set and stop timers or elapsed time indicators automatically based on activity levels in a surrounding or start/stop activities of certain apparatus used in a given task or activity.

Figure 2:
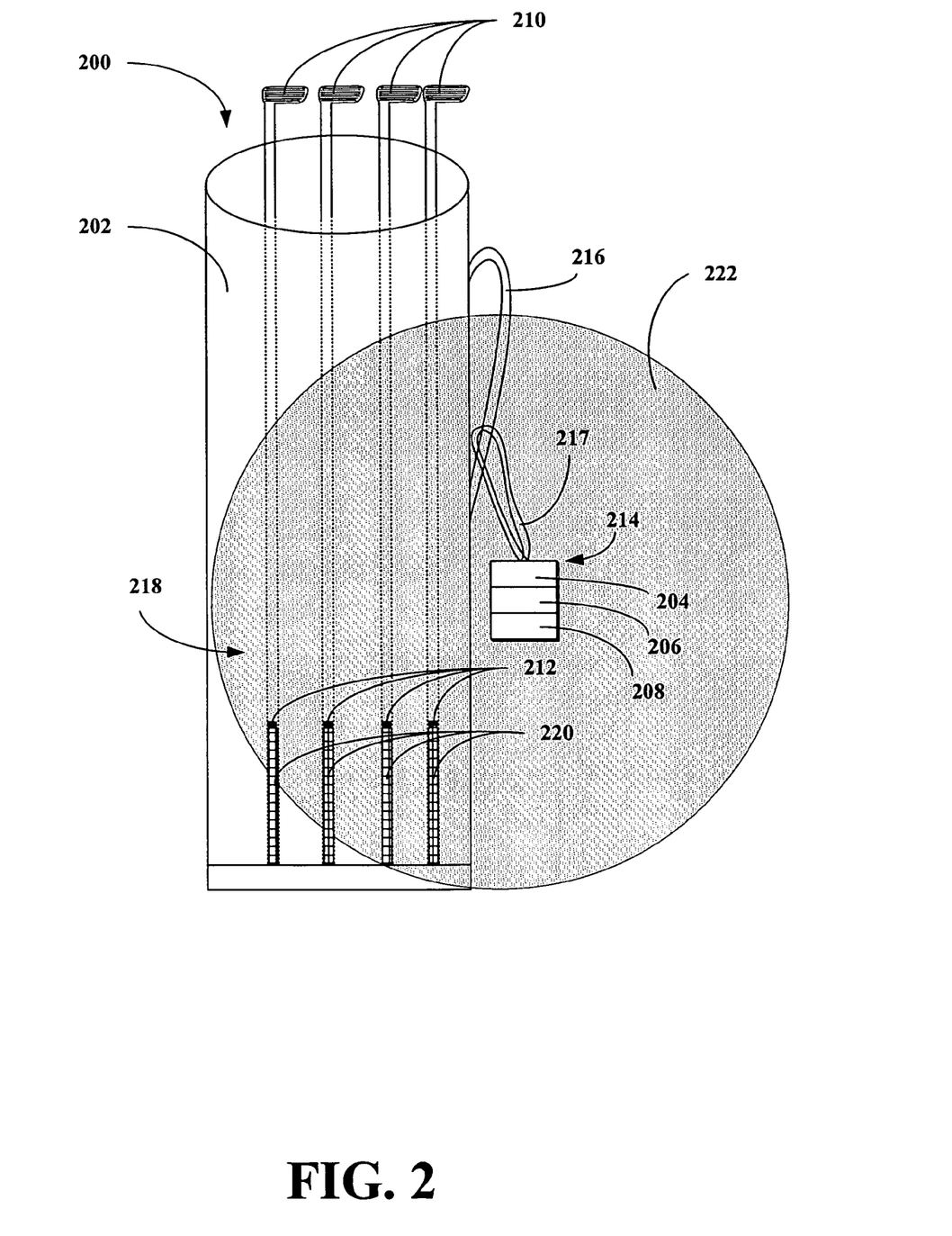
FIG. 2 is an alternative preferred embodiment of a golf bag inventory system of the present invention.

Referring now to FIG. 2, a preferred embodiment of a golf bag inventory system 200 generally includes a bag 202 having associated therewith a DPU 204, an interrogator/reader 206 in communication with the DPU 204, and a power source or supply 208 for supplying electrical power to the DPU 204 and the interrogator 206. Preferably, the interrogator/reader 206 has a field range sufficient to activate tags on items located inside the golf bag 202, but not tags on items located outside the bag 202. The power supply 208 is generally a battery, with lithium batteries being preferred. As in the system of FIG. 1B, the DPU 204 generally includes at least a processor, a memory, a peripheral, communication hardware, an operating system, a file processing routine(s), and communication software. The bag 202 also includes a plurality of clubs 210; each club 210 having affixed thereto an ACRFID tag 212 encoded with a unique transmission modulation code, where each tag 212 generates a signal modulated by its unique code when the tag 212 is within the range of the field generated by the interrogator/reader 206.

The DPU 204, the interrogator 206 and the power supply 208 are preferably housed in a housing 214 which can be a small shock resistant box, card or other similar housing removably attached, for example, to a carrying strap 216 of the bag 202 by an attachment strap 217. Preferably, each tag 212 is positioned on each club 210 so that the each tag 212 will be located in an interior portion 218 of the bag 202 when the clubs 210 are place properly within the bag 202. One particularly preferred the tag placement is to position each tag 212 at or near a grip 220 of each club 210. However, the tags can be affixed to any portion of the club. The inventor has also found that with items that have substantial metal components, the metal to the item can be used to increase antenna dimension without increasing the actual size of the antenna associated with the tag itself.

Preferably, the interrogator/reader 206 generates a field 222 sufficient to activate all tags on all items in the golf bag 202 or very near the bag. Because the control system associated with a golf bag is designed to notify golfers when equipment such as clubs are not placed back into the bag after use, the field 222 associated with the interrogator 206 is preferably of a relatively limited range. Generally, the field 222 should be able to activate tags 212 within about a volume have a radius of about 2 feet or less centered about the interrogator 206 and preferably a radius of about 1.5 feet or less and especially a radius of about 1 foot or less. Again, the field strength needed to activate tags in a given volume will depend on the power of the RF field generated by the interrogator and the size of the receiving antenna associated with the tag. As the RF power increases the size of the antenna associated with the tags can decrease and vis-a-versa.

Alternatively, the DPU, the interrogator, and the power supply can be housed in a compartment within the bag. It should also be recognized that the DPU, interrogator and power supply can be a single or multi-piece device and can be relatively small in size. The DPU is generally includes a relatively modest processor and memory; virtually any digital processing unit can be used.

Figure 3:
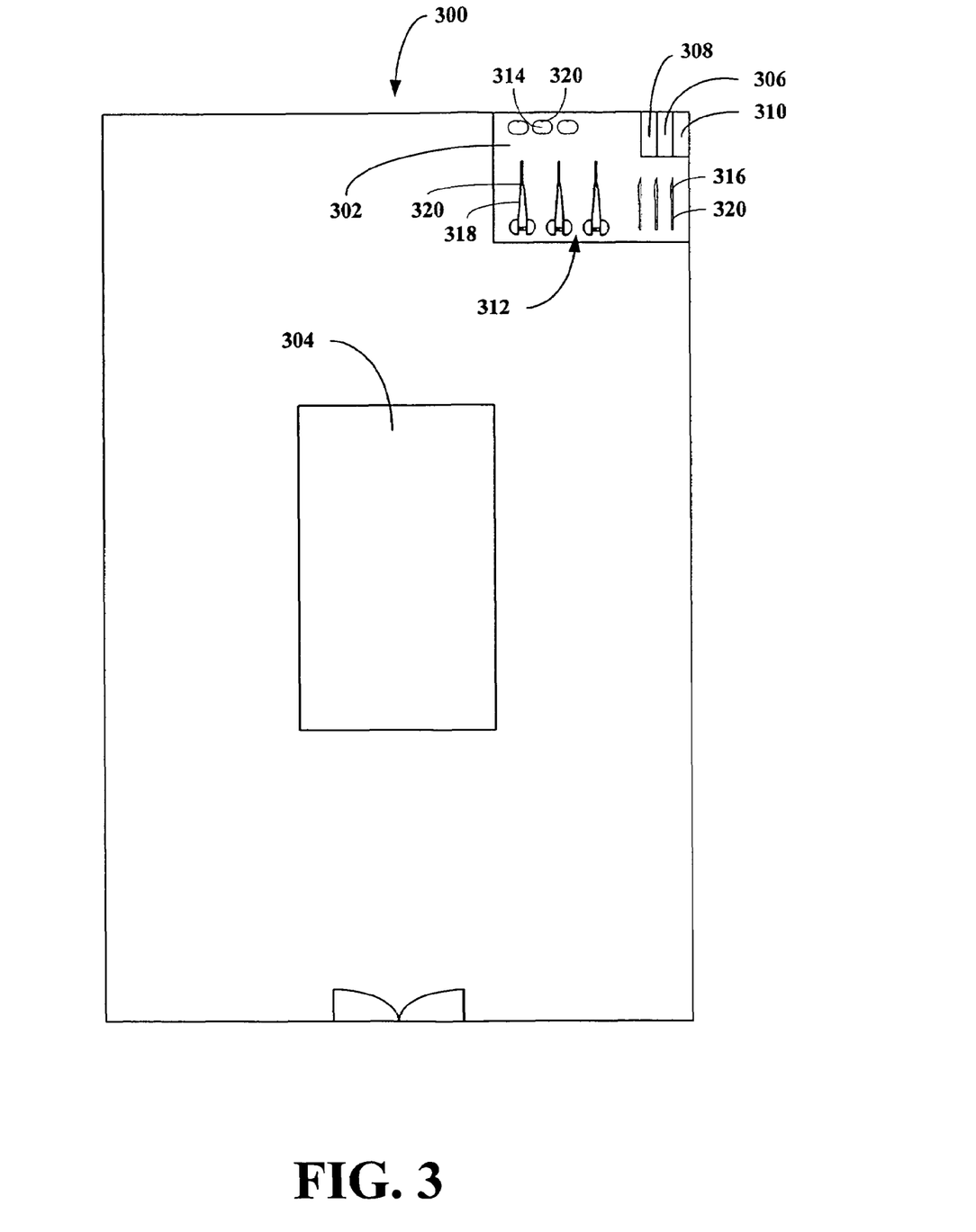
FIG. 3 is an alternative preferred embodiment of the present system located in an hospital operating room.

Referring now to FIG. 3, another preferred embodiment of the present system is shown located in an operating room 300 which includes an equipment table 302 and an operating table 304. Associated with the equipment table 302 is a DPU 306, an interrogator/reader 308 in communication with the DPU 306, and a power source or supply 310 for supplying electrical power to the DPU 306 and the interrogator 308. The power source 310 is generally either an AC outlet or a battery, with an AC outlet being preferred. As shown in FIG. 1B, the DPU 306 generally will include at least a processor, a memory, a peripheral, communication hardware, an operating system, a word or list processing routine or routines and communication software (not shown). Preferably, the interrogator/reader 308 will have a field range sufficient to activate all tagged items on the equipment table 302, but insufficient to activate items activated items not on the equipment table 302. The size of the field needed will be related to the size of the table for which the inventory control system is designed. Preferably, the field should have a range somewhat smaller than the size of the equipment table 302 to ensure that equipment is returned to a position within the field associated with the equipment table 302 after an operation.

The equipment table 302 generally includes a plurality of medical items 312 used in operations such as sponges 314, scalpels 316, retractors 318 or the like. Each item 312 has affixed thereto an ACRFID tag 320 encoded with a unique transmission modulation code, whereby each tag 320 generates a signal modulated by its unique code when the tag 320 is within the range of the interrogator/reader 308.

Figure 4:
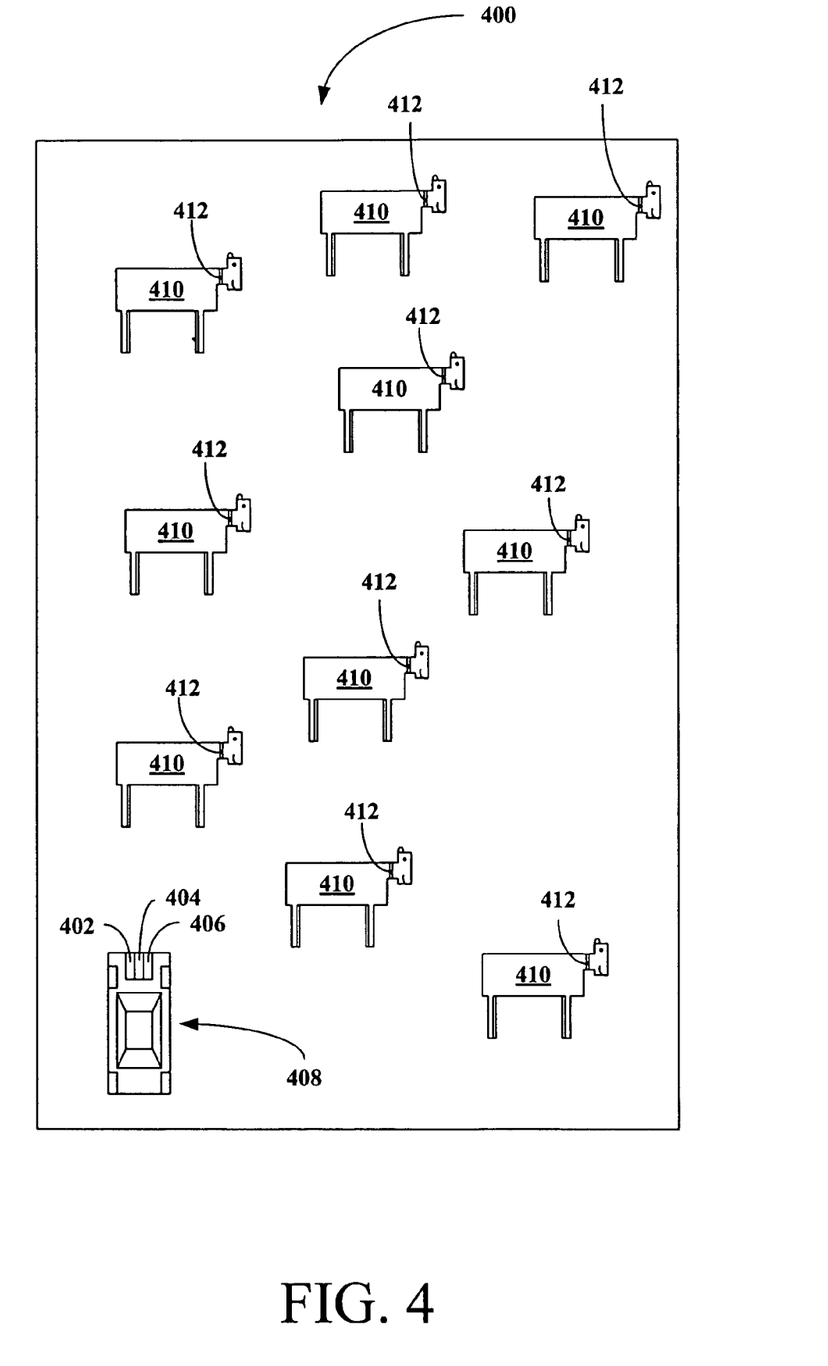
FIG. 4 is an alternative preferred embodiment of the present system is located in a pasture.

Referring now to FIG. 4, another preferred embodiment of the present system is shown conjunction with an animal containment area such as in a pasture 400 including a DPU 402, interrogator/reader 404 in communication with the DPU 402, and a power source 406 for supplying electrical power to the DPU 402 and the interrogator 404, all generally located in a vehicle 408. The power source 406 may be a battery associated with the starting system of the vehicle 408; however, the power source can be a separate generator, or a separate battery with lithium batteries being preferred. As in FIG. 1B, the DPU generally includes at least a processor, a memory, a peripheral, communication hardware an operating system, file processing routine and communication software.

The pasture 400 also includes a plurality of livestock 410, each animal 410 having affixed thereto a RFID tag 412 encoded with a unique transmission modulation code, whereby each tag 412 generates a signal containing its unique code when the tag 412 is within the range of the interrogator/reader 404. The interrogator/reader 404 generates a field having range sufficient to activate the tags 412 affixed to animals 410 when the vehicle 408 is within a predetermined distance from the animal, with a range of about 5 feet being preferred and a range of about 10 foot being particularly preferred.

Of course, the DPU, interrogator and power source can also be positioned on alternative transport means, for example, a horse or a helicopter. The computer software in this preferred embodiment would be programmed differently and would not be designed to indicate that all animals were in the pasture. Thus, the software could be programmed so that, initially, all the status fields associated with the animals would be in a FALSE condition. The vehicle would then travel through the pasture as the vehicle passed near an animal, its tag would be activated, and the software would change the status to TRUE. The DPU could also include data on each animal to aid the driver in locating and identifying animals.

Alternatively, the DPU, interrogator and power source can be associated with a gate, entrance or exit to a pasture or corral. In such an embodiment, the computer software would change the status of an animal to a present or TRUE condition when the animal passed through the gate, entrance or exit.

Figure 5:
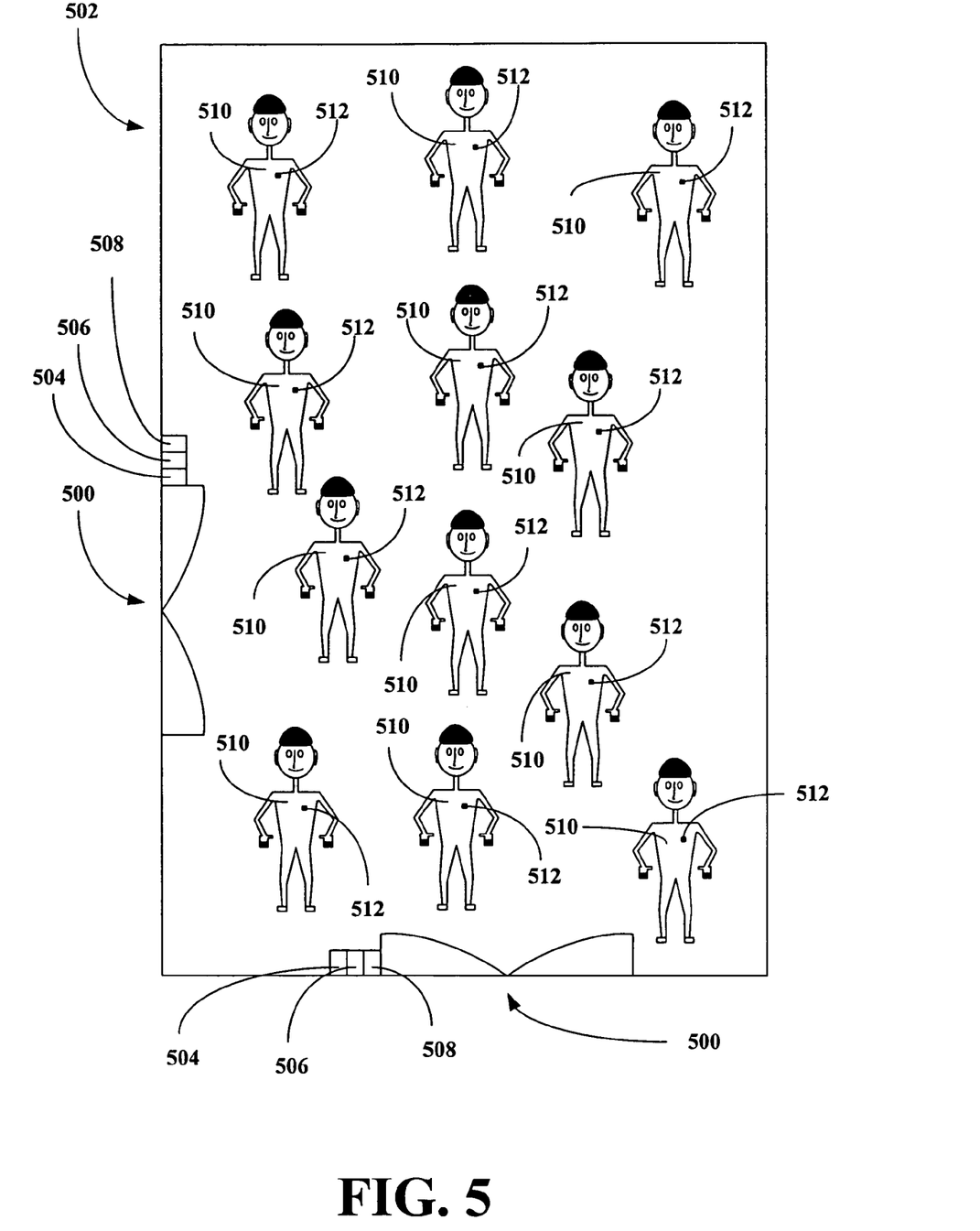
FIG. 5 is an alternative preferred embodiment of the present system located in a children's play area.

Referring to FIG. 5, yet another preferred embodiment of the present system is shown located at each entrance or exit 500 to a children's play area 502 which includes a DPU 504, an interrogator/reader 506 in communication with the DPU 504, and a power source 508 for supplying electrical power to the DPU 504 and the interrogator 506. The power source 508 is preferably either a power supply plugged into an AC plug or a battery, with lithium batteries being preferred. As in shown in FIG. 1B, the DPU includes at least a processor, a memory, a peripheral, communication hardware an operating system, file processing routine and communication software. The area 502 will periodically include a plurality of children 510; each child 510 wearing an RFID tag 512 encoded with a unique transmission modulation code, whereby each tag 512 generates a signal containing its unique code when the tag 512 is within the range of the interrogator/reader 506. The interrogator/reader 506 has a field range sufficient to activate a tag 512 passing through the entrance or exit 500. In this embodiment, the software is designed to trigger an alarm whenever a child 510 passes within range of the field generated by the interrogator 506. The alarm may serve to notify attendants that a child is attempting to leave the area without having its tag removed.

Although the invention has been disclosed with reference to its alternative preferred embodiments, from reading this description, those of skill in the art may appreciate changes and modification that may be made which do not depart from the scope and spirit of the invention as described above and claimed hereafter.

We claim:

1. An inventory control apparatus comprising:
a computer including:
a list implemented therein comprising:
a unique item identifier for each item in an inventory;
a unique item code; and
an item status;
an anti-collision, field activated apparatus affixed to each item in the inventory including a programmable memory storing its unique item code, a transmitter, anti-collision hardware and software and an antenna; and
an interrogator/reader in communication with the computer and including:
a field generator capable of generating a field having a range characterized by a radius centered at the generator and a field strength sufficient to activate any field activated apparatus affixed to an item within the range of the generated field; and
a receiver,
where each anti-collision, field activated apparatus affixed to an item of inventory within the range of the generated field periodically transmits a signal including its unique item code only when anti-collision hardware and software of each anti-collision, field activated apparatus determines that no other anti-collision, field activated apparatus is transmitting its periodic signal and where the status of each item whose field activated apparatus has transmitted its signal to the receiver of the interrogator/reader is set to a first state indicating that the item is inside the range of the generated field, while the status of all other items is set to a second state indicating that the all other items are outside of the range of the generated field.

2. The apparatus of claim 1, wherein the computer further comprises:
a processing unit for executing instructions;
a memory in electrical communication with the processing unit for storing an operating system, list processing software and the lists;
a peripheral in electrical communication with the processing unit and the memory for interfacing with a user; and
communication hardware and software in electrical communication with the processing unit and the memory for wireless and non-wireless communication with the interrogator/reader and the peripheral.

3. The apparatus of claim 1, wherein the field is an RF field.

4. The apparatus of claim 1, wherein each unique item code is at least 7 bits in length.

5. The apparatus of claim 1, wherein each unique item code is at least 15 bits in length and the field activated apparatus transmits a signal having a frequency between about 10 and 15 MHz.

6. The apparatus of claim 5, wherein the items are golf clubs and the inventory control apparatus is associated with a golf bag.

7. The apparatus of claim 5, wherein the items are medical equipment used in medical procedures and the inventory control apparatus is associated with an equipment table in an operating room.

8. The apparatus of claim 5, wherein the items are children and the inventory control apparatus is associated with a playground or play area.

9. The apparatus of claim 5, wherein the items are animals and the inventory control apparatus is associated with a pasture or corral.

10. A golf club bag inventory apparatus comprising:
a golf club bag;
a housing removably attached to the bag including:
a digital processing unit having:
a list implemented therein comprising:
a unique item identifier for each item in an inventory;
a unique item code; and
an item status;
an interrogator/reader apparatus in communication with the computer and capable of generating a field having a range characterized by a radius centered at the interrogator/reader and a field strength sufficient to activate all field activated apparatuses within the bag; and
a power source for supplying electrical power to the digital processing unit and the interrogator/reader;
a plurality of field activated apparatus affixed to each item to be place within the bag, each field activated apparatus including a programmable memory storing its unique item code, a transmitter, anti-collision hardware and software and an antenna and capable of transmitting a modulated signal including its unique item code when activated by the field generated by the interrogator/reader; and
where each field activated apparatus associated with an item within the range of the field periodically transmits its uniquely modulated signal only when anti-collision hardware and software of each anti-collision, field activated apparatus determines that no other anti-collision, field activated apparatus is transmitting its periodic signal and where an item status is set to a first state if its unique item code is received by the interrogator/reader and set to a second state if its unique item code is not received by the interrogator/reader.

11. The bag of claim 10, wherein the digital processing unit further comprises:
a processing unit for executing instructions;
a memory in electrical communication with the processing unit for storing an operating system, list processing software and the lists;
a peripheral in electrical communication with the processing unit and the memory for interfacing with a user; and
communication hardware and software in electrical communication with the processing unit and the memory for wireless and non-wireless communication with the interrogator/reader and the peripheral.

12. The bag of claim 10, wherein the field is an RF field.

13. The bag of claim 10, wherein each unique item code is at least 7 bits in length.

14. The bag of claim 10, wherein each unique item code is at least 15 bits in length and the field activated apparatus transmits a signal having a frequency between about 10 and 15 MHz.

15. A method for inventory control comprising the steps of:
affixing to each item in an inventory a field activated apparatus including a programmable memory storing its unique item code, a transmitter, anti-collision hardware and software and an antenna and, upon activation, capable of transmitting a signal modulated with the unique item code;
generating a field having a range characterized by a radius centered at a field generator associated with an interrogator/reader and a field strength sufficient to activate any field activated apparatus affixed to any item of the inventory within the range;

receiving periodic signals transmitted by each field activated apparatus associated with each item within the range of the field only when anti-collision hardware and software of each field activated apparatus determines that no other anti-collision, field activated apparatus is transmitting its periodic signal;

setting an item status to a present state in a list implemented on a digital processing unit associated with the interrogator/reader, where the list includes at least an unique item identifier for each item in the inventory, the unique code for the field activated apparatus affixed to each item, and the item status for each signal corresponding to an item in the inventory received in the receiving step; and setting the item status to an absent state for each item for which no signal was receive in the receiving step.

16. The method of claim 15, further comprising the step of:

outputting the list indicating which items of the inventory are in a present state and which are in an absent state.

17. The method of claim 16, wherein the digital processing unit further comprises:

a processing unit for executing instructions;

a memory in electrical communication with the processing unit for storing an operating system, list processing software and the lists;

a peripheral in electrical communication with the processing unit and the memory for interfacing with a user; and communication hardware and software in electrical communication with the processing unit and the memory for wireless and non-wireless communication with the interrogator/reader and the peripheral.

18. The method of claim 15, wherein the field is an RF field.

19. The method of claim 15, wherein each unique code is at least 7 bits in length.

20. The method of claim 15, wherein each unique code is at least 15 bits in length and the field activated apparatus transmits a signal having a frequency between about 10 and 15 MHz.

21. The apparatus of claim 1, wherein each field activated apparatus transmits a periodic signal only when no other field activated apparatus transmits a periodic signal.

22. The apparatus of claim 10, wherein each field activated apparatus transmits a periodic signal only when no other field activated apparatus transmits a periodic signal.

23. The method of claim 15, wherein each field activated apparatus transmits a periodic signal only when no other field activated apparatus transmits a periodic signal.

* * * * *